Jan. 29, 1935. T. H. SYMINGTON 1,989,433
SNUBBED TRUCK SPRING
Filed July 1, 1930

Inventor
Thomas H. Symington
By John Milton Jester
Attorney

Patented Jan. 29, 1935

1,989,433

UNITED STATES PATENT OFFICE 1,989,433

SNUBBED TRUCK SPRING

Thomas H. Symington, Baltimore, Md., assignor to T. H. Symington & Son, Inc., Baltimore, Md., a corporation of Maryland Application July 1, 1930, Serial No. 465,182

14 Claims. (Cl. 267—4)

The invention relates to railway truck spring suspension.

It is well known that the ordinary means for supporting the truck bolster in a railway car truck comprises a group or nest of helical springs, the number and capacity of which necessarily varies in accordance with the character of the car. The springs in any group or nest are customarily of the same height, travel and capacity. A great difficulty has been that a spring assembly capable of properly sustaining the maximum load is too stiff to provide proper resilience under no load or light load conditions. Conversely, a spring suspension which will act satisfactorily under light load conditions will go solid and fail to function under maximum load conditions. The problem has consequently arisen as to the obtaining of a proper balance. Furthermore, as the ordinary springs have the same characteristics they also have the same period of vibration, the result being that oscillations starting for instance by passage of the wheels over rail joints or low spots in the track build up when the spring deflections become synchronized with the passage of the wheels over rail joints, etc., and this cumulative action may even cause derailment of the truck.

It is with all of the above facts in view that I have devised the present invention which has for its general object the provision of a spring assembly including spring units of ordinary type combined with a friction producing means adapted to come into play upon partial deflection of the standard springs for absorbing shocks and providing the proper cushioning effect under heavy load conditions, the usual springs performing their function satisfactorily under light load conditions.

An important object of the invention is to provide a shock absorbing suspension mechanism in which one or more of the ordinary springs may be simply replaced by friction producing units.

Another object of the invention is to provide a mechanism of this character in which the friction producing means is of less height and travel than the ordinary helical springs so that the spring and friction means will operate sequentially and then simultaneously.

Another object of the invention is to provide an assembly in which the free or live standard springs are assisted under heavy load conditions by a combined spring and friction producing means having high absorption capacity, the standard helical springs being thereby relieved of strain which might otherwise cause them to go solid.

Another object of the invention is to provide an absorption unit embodying a combination of friction producing elements and spring elements arranged and mounted in cooperating relation, this unit being capable of employment to replace a helical spring in a standard spring nest so that the ultimate capacity of the entire assembly may be quickly increased.

Another important object of the invention is to provide a cushioning means embodying an absorption unit in which the combined spring and friction producing means may be lubricated and maintained in such condition without the provision of any auxiliary housing or the like, the purpose being to prevent any unnecessary wear on the parts so that their life will be prolonged.

Another object of the invention is to provide an absorption unit having an ultimate capacity many times that of what will be required of it even in the most strenuous service so that the elements will not be subjected to any undue fiber stresses and will therefore be free from excessive strains and not liable to breakage, stretching or other distortion.

To the attainment of the foregoing and other objects and advantages, the invention preferably consists in the details of construction and the arrangement and combination of parts to be hereinafter more fully described and claimed, and illustrated in the accompanying drawing in which:

Figure 2:
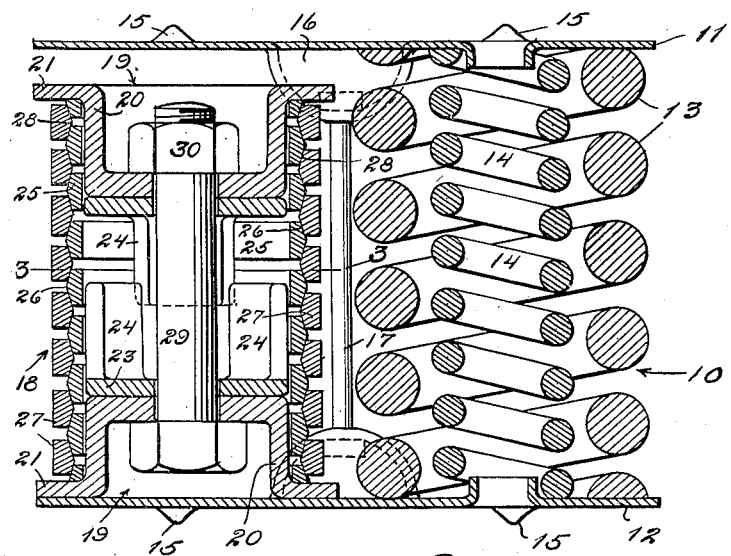
Figure 2 is a vertical cross sectional view taken on the line 2—2 of Figure 1.
Figure 3:
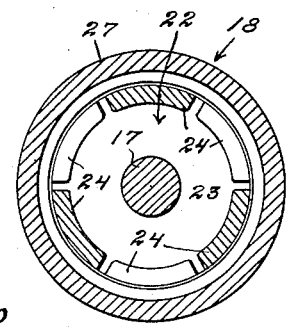
Fig. 3 is a detail cross section taken on the line 3—3 of Figure 2.
Figure 4:
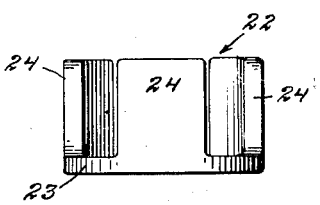
Figure 4 is a detail elevation of one guide member.
Figure 1:
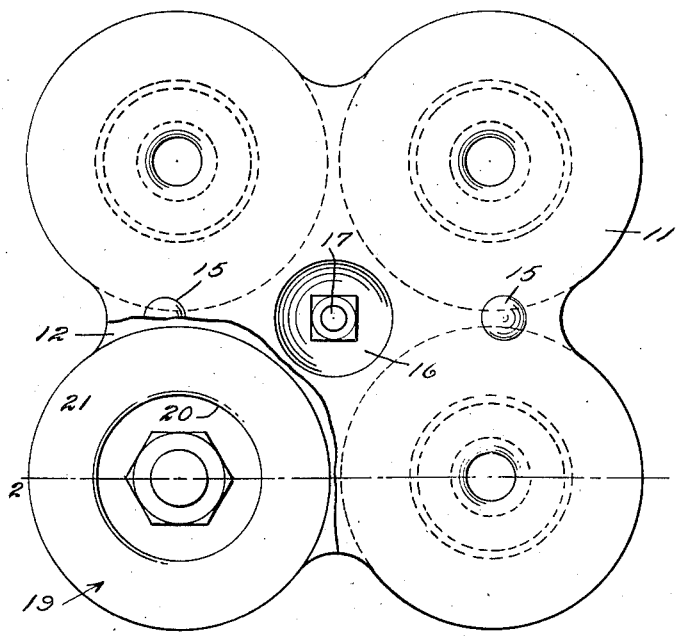
Figure 1 is a plan view of a spring nest with a portion of the top cap broken away to show a plan view of the novel friction producing or absorption unit.

Referring more particularly to the drawing it will be observed that I have disclosed a spring nest, group or assembly indicated as a whole by the numeral 10 and comprising upper and lower spring plates or caps 11 and 12 between which is a plurality of spring units which may be of the single or double coil type, as preferred, but which are here represented as including outer coils 13 and inner coils 14. This assembly or nest is of course intended to be mounted in the window opening of a side frame in the usual manner and the spring plates or caps are therefore shown as having the usual tits or projections 15 thereon adapted to enter holes or recesses in the bottom of the window opening and the underside of the bolster so that the nest will be retained in place.

As is customary, the spring plates or caps have depressed central portions 16 extending toward each other and connected by a tie bolt 17 for holding the parts assembled prior to installation in a truck. In the present instance the nest is shown as of the four unit type but it will be distinctly understood that this is simply for purposes of illustration as it is well known that higher capacity cars are equipped with spring nests embodying a larger number of units.

In carrying out my invention I provide an absorption mechanism formed as a complete and separate unit or entity and indicated as a whole by the numeral 18, this unit being intended to replace one of the spring units. It is of course apparent that more than one absorption unit may be used if preferred though ordinarily one is probably sufficient.

The friction producing unit 18 is here disclosed as comprising similar or counterpart upper and lower caps 19 which may be formed as drop forgings, stampings or the like but which are preferably the former. Each of these caps includes a cylindrical portion 20 terminating at one end in an outstanding flange 21, and the two flanges are arranged adjacent the upper and lower spring caps as clearly indicated, the lower cap being preferably spot welded or otherwise secured to the lower cap 12. It is intended that these caps engage and confine between them the combined spring and friction producing means and as this means comprises a plurality of coacting elements, the cylindrical portions 20 of the caps constitute guides. However, as there is considerable space between the adjacent ends of the caps it becomes necessary to provide other guide means and this may be readily accomplished by arranging between the caps a pair of guide members 22 which may likewise be formed as pressings or stampings but which are preferably drop forgings spot or otherwise welded to the caps. It is even conceivable that these guides 22 might be formed integrally of the caps, this being considered a very minor detail. Each of the guides is represented as including a circular or disk-like horizontal portion 23 from which extend lugs or fingers 24, these fingers on the two guide members interfitting as clearly indicated in Figure 2 and being of such length as not to interfere with relative movement of the caps 19 toward each other, or more precisely, downward deflection of the unit, to the maximum extent desirable. While spot welding is referred to as the means or method of connecting the guide members 22 with the caps 19 it is conceivable that some other securing means might be resorted to if ascertained to be advantageous.

The resilient friction producing means is shown as comprising an inner series of spring rings 25 spaced apart and surrounding the cylindrical portions 20 of the caps and also surrounding the assembled interfitting fingers 24. These inner rings are of double frusto-conical shape, that is to say their outer peripheries are tapered off or reduced gradually in diameter from the center toward both ends so as to provide inclined friction faces 26. Located outwardly of and coacting with the rings 25 and located opposite the spaces therebetween and in overlapping relation thereto are outer spring rings 27 which have their inner peripheries flared outwardly from the center toward both ends or edges and corresponding to the taper or inclination of the inclined faces 26, these inclined faces on the outer series of rings being indicated at 28.

The intention is that the friction unit 18 be put in the first place under a certain initial compression so that under light load conditions the weight of the car and its lading will be borne by the standard spring units. This means that the friction unit is not to become operative until the load on the nest exceeds a certain predetermined limit. As a consequence it is intended that the top of the friction unit be spaced somewhat below the upper cap of the nest in order that it will not be engaged thereby to energize the friction unit until the predetermined load has been exceeded. To bring this about is really a very simple matter and to accomplish it I preferably provide a tie bolt 29 which passes through the caps 19 and through the centers of the disk portions 23 in the guide members 22.

In actual practice under the A. R. A. standard the free height of the helical springs in a nest such as that disclosed is 8¼ inches. As mentioned above it is intended that the nut 30 on the tie bolt 29 be screwed down to reduce the free height of the friction unit 18 so that the helical springs may be compressed for a portion of their travel before the friction unit becomes effective. However, the exact degree of the initial compression of the friction unit is a matter which depends upon different circumstances, that is to say number of helical springs in the unit, the capacity of the nest, the character of the car and the lading to be carried thereby, etc. No dimensions or no relative proportions of the normal height of the friction unit with respect to the free height of the helical springs are given as it is easily conceivable that there may be considerable variations brought about to suit different requirements by the very simple expedient of adjusting the nut 30 which is, however, not intended to be shifted after the unit is set for a certain definite installation. Springs or spring rings of the type shown at 25 and 27 and arranged in a manner such as that disclosed are capable of withstanding a tremendous pressure, the total capacity of a unit built up from the number of elements shown being in the neighborhood of 82,000 pounds which is far more than the unit will ever be called upon to withstand, it being probable that the load will not exceed one-half of this amount. In general practice it is very likely that an initial compression of 4,000 or 5,000 pounds, brought about by the tie bolt 29, will be entirely sufficient to reduce the free height of the friction unit to a point where the helical springs may have the desired travel before the friction unit becomes effective so that the latter may operate as a reserve cushioning means for snubbing any further compression of the helical springs.

In the operation, it will be seen that under light or moderate load conditions the weight is borne by the helical springs. However, when there is any tendency for the helical springs to go solid, either as the result of overloading or insufficient capacity thereof, or as the result of vertical jiggle of the truck bolster, such as results from synchronization of vibration of the helical springs with passage of the car wheels over rail joints, low spots, etc., the upper spring cap will engage upon the upper cap 19 of the absorption unit and will exert a strong downward thrust upon the inner and outer series of rings 25 and 27. Owing to the fact that the inner rings have frusto-conical outer peripheries and the outer rings have the correspondingly tapered or inclined inner peripheries, there is a wedging action, there being a compressive force exerted radially inwardly upon the inner rings and an expansive force exerted radially outwardly upon the outer rings. Though these rings are continuous they are of spring material and may consequently yield to a limited extent when subjected to very high pressures. Actually there is no great movement of the respective series of rings either inwardly or outwardly though the former can be compressed and the latter stretched slightly. The resistance of these springs to the compressive or expansive force provides resilience of high capacity and at the same time the tendency of the springs to be moved axially results in the development of a high degree of friction between the contacting cooperating tapered or inclined surfaces 26 and 28. This combination of resilience and friction will render this entire unit most advantageous for taking care of overloading of the standard springs in the nest and particularly for snubbing any jiggling movement which may develop. This latter mentioned function is particuarly true as it is obvious that the natural period of vibration of the friction unit 18 is entirely different from that of the standard or helical coil.

If it is so desired, in order to reduce wear or unnecessary wear on the coacting parts, it is a simple matter to pack the interior of the unit 18 with some suitable lubricant inasmuch as the contacting rings 25 and 27 being in close engagement constitute, in effect, a housing which will act to retain the lubricant and prevent it from becoming lost.

From the foregoing description and a study of the drawing it will be apparent that I have thus provided an extremely simple, easily assembled and installed and highly efficient cushioning mechanism for railway car truck bolsters or the like and one in which adequate means has been provided for tremendously increasing the total capacity without requiring entirely new equipment, as the desirable results are achieved by the mere replacement of one of the ordinary spring units with a combined spring and friction unit capable of fulfilling all the functions required of it. It is believed that the construction, operation, and advantages should be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. A railway car truck spring assembly comprising the combination of a plurality of coil springs of A. R. A. standard character and free height, and a special unit of less normal height, the special unit being energized sequentially with respect to the standard springs and then simultaneously therewith under increasing load conditions, said special unit comprising series of respectively laterally compressible and expansible elements and means for energizing the same.

2. A railway car truck spring assembly comprising the combination of a plurality of coil springs of standard free height, and a special unit of less normal height, the special unit being energized sequentially with respect to the standard springs and then simultaneously therewith under increasing load conditions, said special unit comprising a series of laterally compressible spring members and a series of laterally expansible spring members having a wedging relation.

3. A railway car truck spring assembly comprising the combination of a plurality of coil springs of standard free height, and a special unit of less normal height, the special unit being energized sequentially with respect to the standard springs and then simultaneously therewith under increasing load conditions, said special unit comprising a series of laterally compressible spring members and a series of laterally expansible spring members having a tapered interfitting relation.

4. A railway car truck spring assembly comprising the combination of a plurality of standard helical spring units operating to support loads up to a predetermined limit, and a special unit arranged to operate simultaneously with said helical springs beyond said predetermined limit, said special unit embodying coacting series of frictionally engaged concentric spring members maintained under initial compression.

5. A spring assembly comprising a plurality of helical springs and a special unit embodying inner and outer spring rings having wedging engagement, and means for maintaining said special unit under initial compression.

6. A spring assembly comprising a plurality of helical springs and a special unit embodying inner and outer spring rings having wedging engagement, means for maintaining said special unit under initial compression, comprising caps at the ends of the series of spring rings, and means connecting the caps.

7. A spring assembly comprising a plurality of helical springs and a special unit embodying inner and outer spring rings having wedging engagement, means for maintaining said special unit under initial compression, comprising caps at the ends of the series of spring rings, and means connecting the caps, said spring rings contacting closely and cooperating to define a substantial housing for containing lubricant.

8. A railway car truck spring assembly comprising upper and lower caps with a plurality of interposed standard height helical springs, and a special unit interposed between the caps, said special unit comprising a pair of end caps, an inner series of spring rings located between the end caps, an outer series of spring rings, and tie means connecting the end caps for holding said special unit under initial compression, said inner and outer rings having wedging engagement.

9. A railway car truck spring assembly comprising upper and lower caps with a plurality of interposed standard height helical springs, and a special unit interposed between the caps, said special unit comprising a pair of end caps, an inner series of spring rings located between the end caps, an outer series of spring rings, and tie means connecting the end caps for holding said special unit under initial compression, said inner and outer rings having their outer and inner peripheries respectively oppositely tapered from their centers to define coacting frusto-conical portions for exerting a wedging action and developing friction during closure of the unit.

10. A spring assembly comprising a plurality of helical springs and a special unit embodying a series of inner and a series of outer continuous spring rings having wedging engagement and spaced apart axially, caps at the ends of said unit, tie means connecting the caps, and guide means located between the caps and within the inner spring rings.

11. A spring assembly comprising a plurality of helical springs and a special unit embodying a series of inner and a series of outer continuous spring rings out of contact axially having wedging engagement radially, caps at the ends of said unit, tie means connecting the caps, and guide means located between the caps and within the inner spring rings in spaced relation thereto, said guide means having interfitting relation.

12. An absorption unit comprising outer and inner continuous spring rings spaced apart longitudinally and contacting laterally, caps upon the ends thereof, tie means connecting the caps, and guide members located between the caps and within the inner spring member in spaced relation to the latter.

13. An absorption unit comprising outer and inner series of continuous spring rings spaced apart longitudinally and contacting laterally, caps upon the ends thereof, tie means connecting the caps, and guide members located between the caps and within the inner spring member, said guide members having interfitting relation with each other and being spaced from the inner periphery of the inner rings, said caps being spaced from the endmost outer rings and contacting with the endmost inner rings.

14. An absorption unit comprising outer and inner spring members, caps upon the ends thereof, a tie bolt connecting the caps, and guide members located between the caps and within the inner spring member, said guide members being formed as disks covering the innermost portions of the caps apertured for close engagement upon the tie bolt and formed with alternately arranged interfitting fingers.

THOMAS H. SYMINGTON.